United States Patent [19]

Puckette et al.

[11] 3,819,953

[45] June 25, 1974

[54] DIFFERENTIAL BUCKET-BRIGADE CIRCUIT

[75] Inventors: Charles McD. Puckette; Walter J. Butler, both of Scotia, N.Y.

[73] Assignee: General Electric Company, Schenectady, N.Y.

[22] Filed: Nov. 22, 1972

[21] Appl. No.: 308,717

[52] U.S. Cl. .............. 307/221 D, 307/235, 307/242, 307/246, 307/293, 307/304

[51] Int. Cl.. H03k 21/00, G11c 19/00, H03k 17/26

[58] Field of Search ............ 307/221 R, 221 D, 235, 307/242, 246, 293, 304

[56] References Cited

UNITED STATES PATENTS

| | | | |
|---|---|---|---|
| 3,402,355 | 9/1968 | Hannan et al. | 307/221 D |
| 3,474,260 | 10/1969 | Frohbach | 307/221 D |
| 3,500,215 | 3/1970 | Leuthold et al. | 307/221 D |
| 3,546,490 | 12/1970 | Sangster | 307/293 |
| 3,621,283 | 11/1971 | Teer et al. | 307/304 |
| 3,746,883 | 7/1973 | Kovac | 307/221 D |
| 3,758,794 | 9/1973 | Kosonocky | 307/304 |

FOREIGN PATENTS OR APPLICATIONS

| | | | |
|---|---|---|---|
| 2,121,870 | 8/1972 | France | 307/221 D |
| 6,805,705 | 10/1969 | Netherlands | 307/221 D |

OTHER PUBLICATIONS

"Solid State Imaging Emerges From Charge Transport" by Kovac et al. Electronics dTD, Feb. 28, 1972, pages 72–77.

*Primary Examiner*—Stanley D. Miller, Jr.
*Attorney, Agent, or Firm*—Louis A. Moucha; Joseph T. Cohen; Jerome C. Squillaro

[57] ABSTRACT

A pair of bucket-brigade delay lines have equal numbers of bucket-brigade stages, and corresponding stages are clocked in parallel and in-phase. The analog input signal to the circuit is applied to a differential driver for inverting the analog input signal to one of the delay lines relative to the other delay line. The outputs of the delay lines are differentially summed and result in an output waveform which is a sampled and delayed version of the analog input signal with cancellation of D.C. and clock frequency components that are normally introduced in bucket-brigade delay line circuits.

16 Claims, 12 Drawing Figures

DIFFERENTIAL BUCKET-BRIGADE CIRCUIT

Our invention relates to an electronic circuit of the bucket-brigade type, and in particular, to a bucket-brigade circuit operating in a differential mode to obtain cancellation of DC and clock frequency components that are normally introduced during the operation of such a circuit.

The recently developed bucket-brigade circuit is currently finding use in many applications such as audio and video delay, time-error correction, time-scale conversion and filtering as some examples. The bucket-brigade circuit herein abbreviated to BBDL for bucket-brigade delay line, is variously described as a sampled-data circuit or as a digitally controlled analog charge transfer circuit, but may be most simply described as an analog signal shift register. The bucket-brigade circuit thus provides a means for realizing an electronically variable delay line which has many uses in analog signal processing. The conventional bucket-brigade circuit may be generally described as a series array of capacitors interconnected by suitable electronic switches which, when implemented in monolithic form, may be transistors of any type such as bipolar or the field effect type MOSFET, JFET or MESFET. Information is stored as charge packets in such array of capacitors and is caused to be propagated through the array at a rate determined by the (clock) rate at which the switches are sequentially opened and closed. The bucket-brigade circuit, therefore, provides a noninductive means for implementing an analog delay line, the delay of which is controlled by an external clock, in single monolithic integrated circuit form.

The analog input signal to the BBDL is generally biased by a particular polarity voltage to center such input signal on the dynamic range window of the BBDL. Operation of the BBDL further introduces DC type displacement voltages due to the gate and threshold voltage values associated with the particular transistors employed in the BBDL. As a result, the signal at the output of conventional BBDL circuits includes undersired DC components as well as the clock frequency and harmonics thereof which can cause improper operation of circuits connected to the output of the BBDL. In the prior art, capacitor decoupling has been utilized at the output of the BBDL for removing the DC component and has been satisfactory in continuous-mode operation of the BBDL wherein the clock pulses are continuously applied to the BBDL. However, the BBDL may often be operated in what is described herein as a gated clock-mode wherein information is read into the BBDL and stored therein for a particular time interval by turning off the clock generator for such interval, and then is again turned on for an interval during which time new information is read into the BBDL while simultaneously reading out the information that has been stored therein. In such gated clock-mode of operation, the capacitor decoupling is relatively ineffective because the decoupling capacitor is sensitive only to the average DC value of the output waveform of the BBDL; and therefore cannot restore the average value of the analog component to zero DC level for all duty cycles. Also, leakage currents which vary with temperature cause undesired DC level shifts at the output of the conventional BBDL.

Therefore, one of the principal objects of our invention is to provide a new and improved BBDL circuit which provides cancellation of all undesired DC and clock frequency components in the output signal.

Another object of our invention is to provide the BBDL circuit with the capability for obtaining a zero DC output in either continuous or gated clock-mode operation of the circuit.

A further object of our invention is to provide the BBDL circuit with the capability for obtaining an output signal wherein any DC content is insensitive to temperature variation.

Briefly summarized, and in accordance with the objects of our invention, we provide a BBDL circuit having a differential mode of operation which results in cancellation of DC and clock frequency components normally introduced in the operation of BBDL circuits. Our circuit includes two bucket-brigade delay lines having the same number of bucket-brigade stages which are clocked in parallel and in-phase from a two-phase clock pulse generator. An analog input signal is applied to the input terminal of our circuit and is supplied to the input of a first of the two delay lines. An inverter stage is connected to the input terminal of our circuit for inverting the analog input signal supplied to the second delay line. A suitable DC bias voltage is applied to both BBDLs for centering the analog signal input thereto on the dynamic range windows of the BBDLs. The outputs of the two BBDLs are supplied to a differential summer and the output thereof is a sampled and delayed version of the analog input signal without any undesired DC and clock frequency components which have been canceled in the differential summing operation. An additional BBDL may be connected in push-pull relationship with each of the two BBDLs, or adjacent mode summation may be utilized, for the purpose of self-smoothing in the output signal.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings wherein:

Figures 4A, 4B, 4C, 4D, 4E:
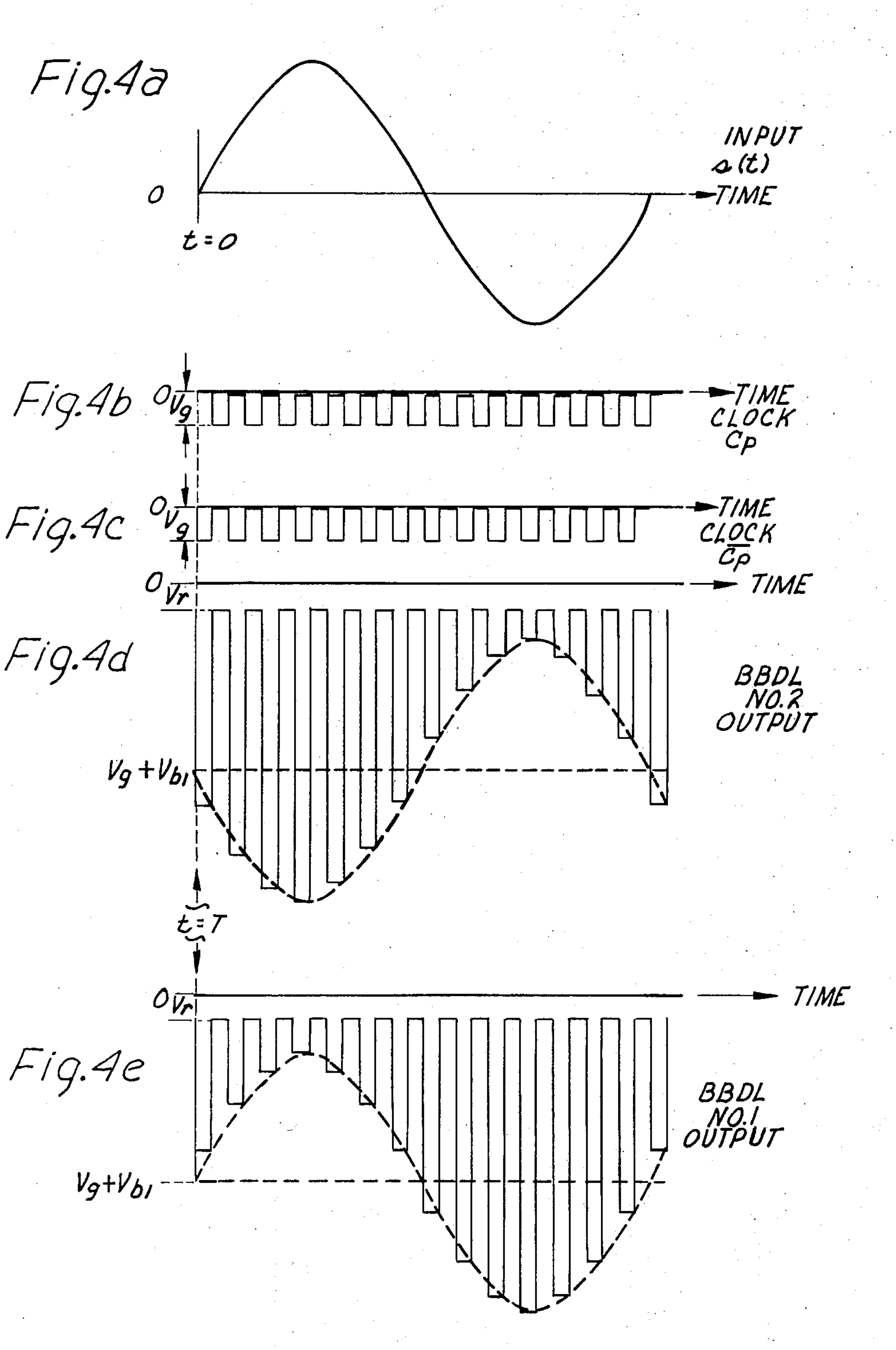
Figure 5:
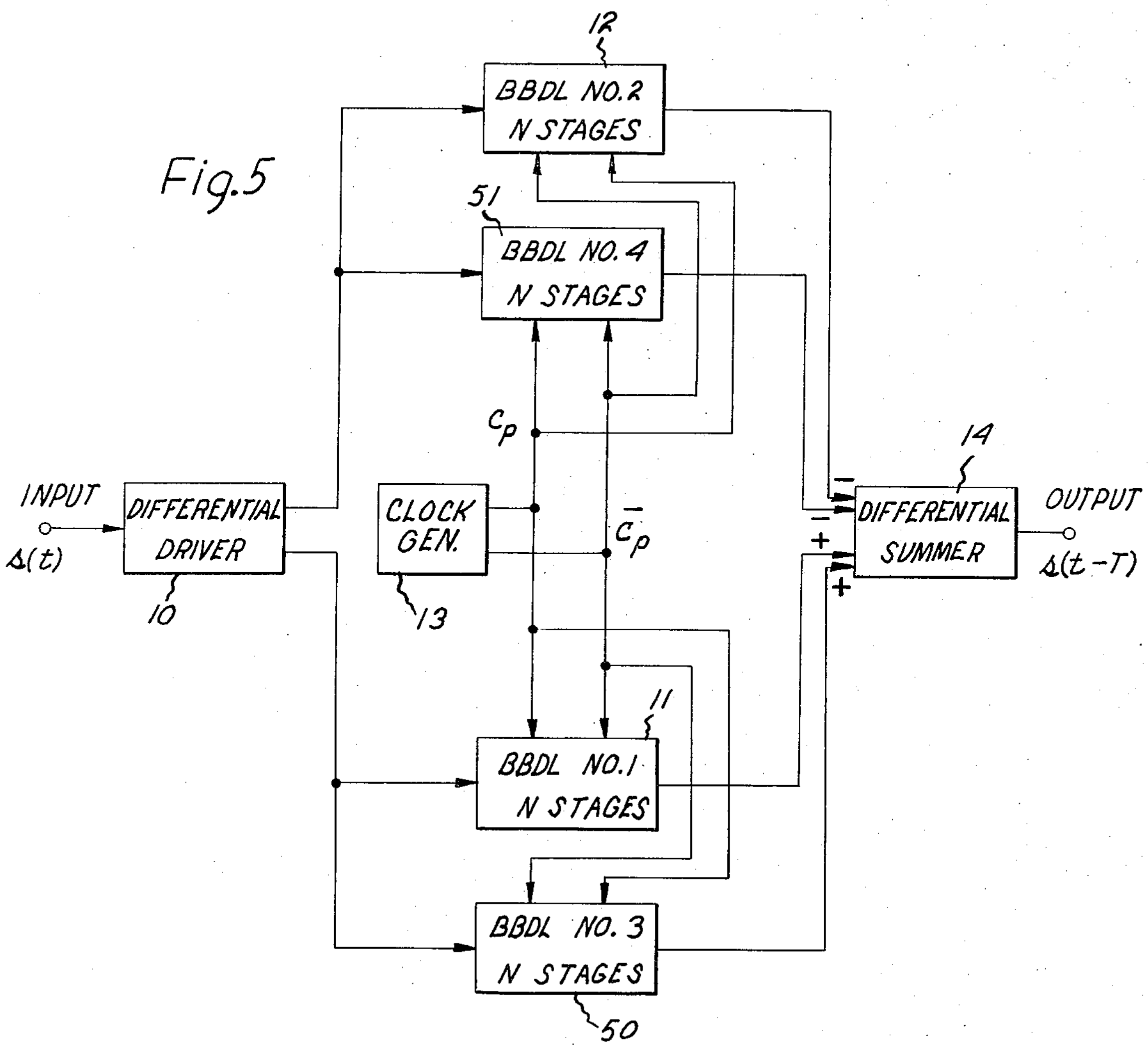

FIGS. 4*a, b, c, d, e, f, g* and *h* represent voltage waveforms versus time existing at various points in our circuit; and FIG. 5 is a block diagram of our circuit illustrating push-pull BBDL circuits for obtaining clock frequency cancellation and self-smoothing at the output.

Figures 1, 2, 3:
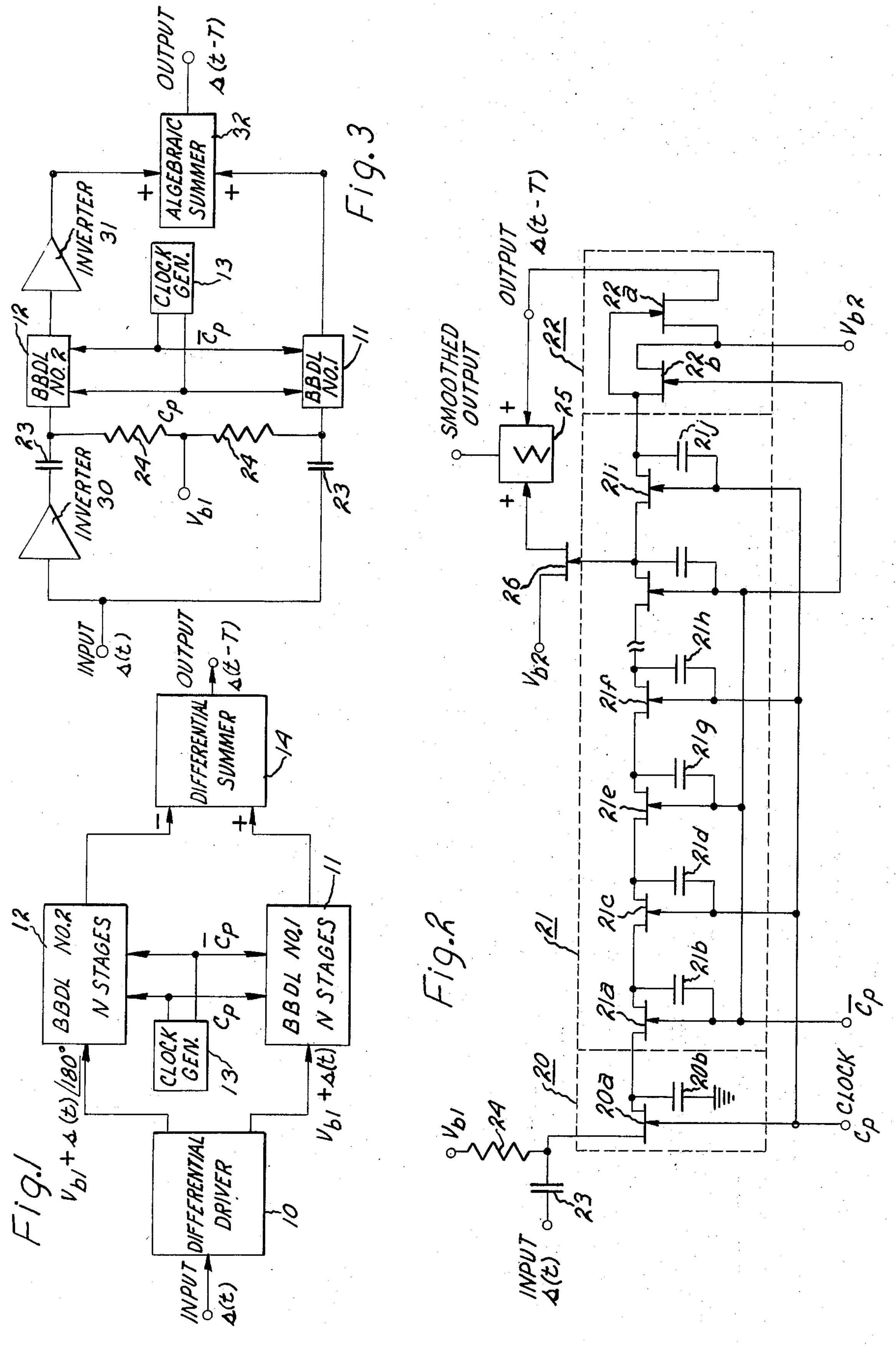
FIG. 1 is a general block diagram of a first embodiment of our invention.
FIG. 2 is a schematic representation of one of the two bucket-brigade delay lines indicated in block diagram form in FIG. 1 and also illustrates an adjacent mode summation circuit for self-smoothing at the output of the brigade.
FIG. 3 is a block diagram, partly in schematic representation, of a second embodiment of our invention.

Referring now to FIG. 1, there are shown in block diagram form the basic components of our differential bucketbrigade delay line circuit. FIGS. 4*a–h* show the waveforms versus time of the voltage signals appearing at various designated points in our circuit. Thus, FIG. 4*a* illustrates an analog signal $s(t)$ which is supplied as the input signal to a differential driver circuit component 10. The input signal $s(t)$ is generally of an alternating type having both positive and negative polarity components and is assumed to be sinusoidal although it can have other wave shapes. Input signal $s(t)$ may also include a DC level. The input signal s(t) is summed with, and subtracted from, a DC bias voltage $V_{b1}$ such that the two outputs of differential driver 10 consist of (1) the sum of the bias voltage and analog input signal $[V_{b1} + s(t)]$, and (2) the difference between the bias voltage and analog input signal $[V_{b1} - s(t)]$. The first differential driver output signal $V_{b1} + s(t)$ is applied to the input of a first bucket-brigade delay line 11 consisting of N delay line stages. The second output of differential driver 10, $V_{b1} - s(t)$, which can also be considered as $V_{b1} + s(t) \angle 180°$ for a sinusoidal input signal s(t), is applied to the input of a second BBDL 12 also consisting of N delay line stages. Differential driver circuit 10 may consist of a conventional single inverter stage for achieving inversion of the analog input signal to BBDL 12, a pair of coupling capacitors for passing the generally alternating voltage type analog input signal to the two BBDL inputs, and a DC voltage bias network as shown in FIG. 3. The bias network establishes a suitable DC bias voltage $V_{b1}$ for centering the analog input signal $s(t)$ on the dynamic range window of each BBDL, that is, bias $V_{b1}$ assures that the analog signal will be of only one polarity in its propagation through the BBDLs, so that the p-n (i.e., diode) junctions of the BBDL are not forward biased.

Depending upon the type of channel type semiconductor material utilized in the monolithic fabrication of the BBDL, the analog input signal $s(t)$ to the BBDL may be biased with a positive or negative voltage. Thus, in the case of p-channel type transistor devices, the analog input signal is biased from a source of negative voltage for insuring that the signal applied to the source electrode of input sampling transistor 20*a* (in FIG. 2) is always of negative polarity and thereby prevents forward biasing of p-n junctions within the BBDL. In the case of n-channel type transistor devices, the input bias is of positive polarity.

The two BBDLs 11 and 12 are identical in structure and thereby provide an equal time delay, T, of the sampled version of the analog input signal which appears at the outputs thereof. One of the BBDLs will be described hereinafter in detail with reference to FIG. 2. The bucket-brigade stages of the two BBDLs are clocked in parallel and in-phase from a conventional two-phase digital clock pulse generator 13. Typical clock voltage pulses are illustrated in FIGS. 4*b* and 4*c* and the clock pulses are applied to the BBDLs via the $C_p$ and $\overline{C}_p$ clock lines for sampling the input signal $s(t)$ at the clock frequency. The negative polarity voltage clock pulses, $C_p$ in FIG. 4*b*, are associated with n-channel JFET (or MESFET) bucket-brigades and the pulses in FIG. 4*c* correspond to the complementary (180° out of phase) clock pulses $\overline{C}_p$. In the case of the bucket-brigades being fabricated with p-channel MOSFET devices, FIG. 4*b* represents the complementary clock pulses $\overline{C}_p$ and FIG. 4*c* represents the clock pulses $C_p$ for sampling the input signal $s(t)$ to obtain the resultant negative polarity sampled and delayed BBDL output voltage waveforms $s(t-T)$ illustrated in FIGS. 4*d* and 4*e*. The corresponding output voltage waveforms for an n-channel JFET or MESFET fabricated BBDL would be of positive polarity. The clock pulses are of positive polarity for n-channel MOSFET or p-channel JFET or MESFET brigades. For bipolar brigades fabricated with npn devices, positive polarity clock pulses are required, and for pnp devices, negative polarity clock pulses are required.

The outputs of BBDLs 11 and 12 are illustrated in FIGS. 4*e* and 4*d*, respectively, and it can be seen that the output of each BBDL is a delayed sampled-data signal that switches at the clock frequency between the sample value of the delayed analog signal and a reference level $V_r$. The reference level $V_r$ is equal to the gate voltage $V_g$ (i.e., clock signal voltage amplitude) minus the threshold voltage of the active (transistor) devices in MOSFET BBDLs and is equal to the pinch-off voltage in JFET or MESFET BBDLs. The analog input signal is sampled at a sufficiently rapid (clock) rate such that the envelopes of the sampled-data signals at the BBDL outputs (indicated by dashed line) faithfully follow the input signal waveform $s(t)$.

Figure 4F:
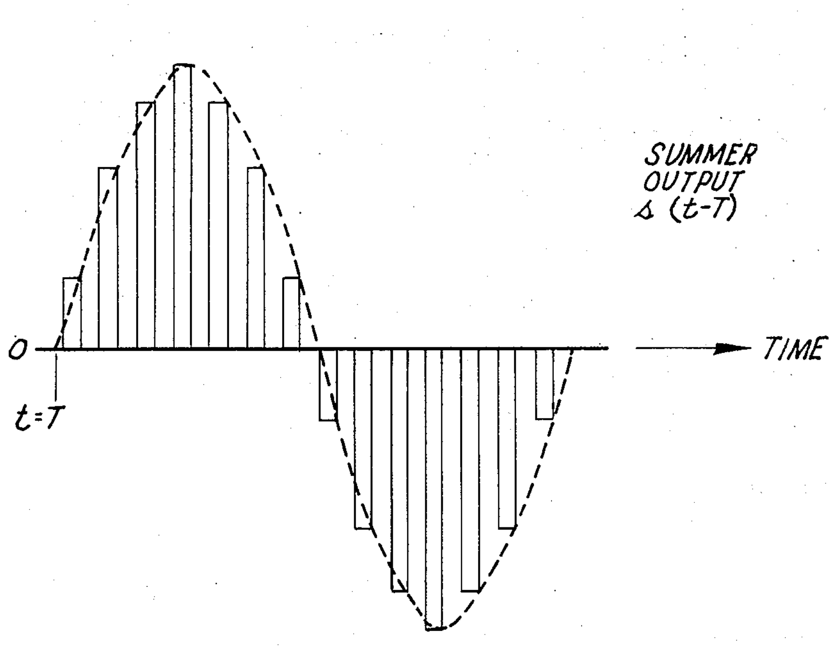

The outputs of BBDLs 11 and 12 are supplied to inputs of a conventional differential summer 14 and the resultant output thereof is a sampled and delayed version of the analog input signal without any undesired DC components which have been canceled in the differential summing operation. This differential mode of operation eliminates both the reference level voltage $V_r$ and $V_g + V_{b1}$ DC components which exist in the BBDL output signals as well as the clock frequency and harmonics thereof. Undesired DC level shifts at the outputs of the BBDLs due to leakage currents varying with temperature will also be canceled by the differential mode of operation. The signal at the output of differential summer 14 is illustrated in FIG. 4*f* and its peak amplitude is twice the peak amplitude of each BBDL output signal illustrated in FIGS. 4*d* and 4*e*. This double amplitude occurs due to the differential summation of the 180° phase displaced (i.e., inverted analog signal component) BBDL output waveforms.

Referring now in particular to FIG. 2, there is illustrated within the dashed outline, one of BBDLs 11 or 12 which consists of an input sampling stage 20, a plurality of delay line stages 21, and an output stage 22. The BBDL thus samples, holds and delays an analog input signal $s(t)$ by a time T which is normally an integral number of (sampling) intervals $T_s$ at which the input signal is sampled. The input sampling stage 20 of the BBDL consists of a first electronic switch 20*a*, which is illustrated in FIG. 2 as a field effect transistor of type JFET or MESFET but which may also be a MOSFET device or the bipolar type transistor. For purposes of illustrating the details of the input end of our circuit, the DC bias voltage network and input coupling capacitor are also indicated in FIG. 2. Thus, coupling capacitor 23 is connected from the circuit input terminal to the source electrode of sampling transistor 20*a*. Resistor 24 has a first end connected to the juncture of capacitor 23 and the source electrode of transistor 20*a*, and a second end connected to a source of DC voltage $V_{b1}$ of appropriate polarity. Transistor 20*a* has its gate electrode connected to the common clock line supplied with the square wave clock pulses $C_p$. The drain electrode of transistor 20*a* is connected to a grounded capacitor 20*b* and to the source electrode of a like transistor 21*a* in the first stage of the delay line stages 21. The input signal sampling interval $T_s$ is thus controlled by the frequency of clock pulses $C_p$.

The plurality of delay line stages 21 are formed by serially connected pairs of bucket-brigade stages. Each pair of bucket-brigade stages includes two serially connected electronic switches (illustrated as n-channel JFETs or MESFETs in FIG. 2) and a charge packet storage capacitor connected across the drain and gate electrodes of each transistor. The transistors in the BBDLs, as well as the storage capacitors, are all identical. The gate electrode of the first transistor in each delay line stage is also connected to the complementary clock pulse line $\overline{C}_p$ whereas the gate electrode of the second transistor is also connected to clock pulse line $C_p$. Thus, capacitor 21*b* is connected across the drain and gate electrodes of transistor 21*a*, and the gate electrode of transistor 21*a* is also connected to the $\overline{C}_p$ clock pulse line. The drain electrode of transistor 21*a* is connected to the source electrode of transistor 21*c* which together with capacitor 21*d* forms the second half of the first pair of bucket-brigade stages. Capacitor 21*d* is connected across the drain and gate electrodes of transistor 21*c*, and the gate electrode is also connected to the common clock line $C_p$. The drain electrode of transistor switch 21*c* is connected to the source electrode of transistor 21*e* in the following pair of bucket-brigade stages consisting of transistors 21*e*, 21*f* and capacitors 21*g*, 21*h*. The second and all further pairs of bucket-brigade stages are serially connected in the same manner as the first stage. The number of pairs of bucket-brigade stages determines the BBDL time delay, T, for a given clock frequency.

The last bucket-brigade stage of the BBDL consists of transistor 21*i* and capacitor 21*j* connected across its drain and gate electrodes. The gate electrode of transistor 21*i* is also connected to the common $C_p$ clock pulse line, the source electrode is connected to the drain electrode of the previous bucket-brigade stage, and the drain electrode could comprise the output of the BBDL. However, for purposes of isolating the output of the BBDL, an output stage 22 is connected to the drain electrode of transistor 21*i*. The output stage 22 comprises a source-follower stage consisting of a transistor 22*a* having its gate electrode connected to the drain electrode of transistor 21*i*, its drain electrode connected to a source of direct current bias voltage $V_{b2}$ (of positive polarity when input bias $V_{b1}$ is positive and of negative polarity when $V_{b1}$ is negative) and its source electrode being the output terminal of the BBDL. A transistor 22*b* having its source electrode connected to the drain electrode of transistor 21*i*, its drain electrode connected to the source of bias voltage $V_{b2}$ and its gate electrode connected to the common complementary clock pulse line $\overline{C}_p$ is utilized as a switching device for precharging the last capacitor 21*j* in the BBDL to a full charge. That is, transistor 22*b* permits filling the last "bucket" in accordance with conventional operation of BBDLs wherein the fullness of the buckets (the capacitive storage elements) proceeds from the last stage toward the first stage and the emptiness of such buckets, which contains the information (sampled analog input signal) to be propagated through the BBDL, proceeds from the first to the last stage. Thus, transistor 22*b* functions as a switch for providing (in conjunction with bias voltage $V_{b2}$) full charge of capacitor 21*j* prior to receiving an analog signal sample. The signal information is represented by the extent to which a full bucket is emptied, that is, the signal propagation through the BBDL from the input to the output ends is affected by means of a charge deficit transfer.

Referring now to FIG. 3, there is shown a second embodiment of our differential bucket-brigade circuit which differs from the FIG. 1 embodiment primarily in the output end thereof. The input end of the FIG. 3 circuit is the same as in FIG. 1. Thus, differential driver 10 is illustrated in FIG. 3 as consisting of a conventional inverter 30, a pair of coupling capacitors 23 and a pair of resistors 24 and DC voltage source $V_{b1}$ forming the bias network. It is assumed that BBDLs 11 and 12 in the FIGS. 1 and 3 embodiments have identical characteristics in which case resistors 24 are of equal value resistance. In the case wherein the two BBDLs do not have identical characteristics, differential driver 10 is a conventional balanced differential driver in that it has a bias balance control and a gain balance control (both of which may be conventional networks) for insuring that the two BBDL outputs are identical with respect to gain and to DC level. Thus, the balanced driver compensates for any difference in characteristics between the two BBDLs such as in gain and DC level. Further, the output of the second BBDL 12 is the inverse of the output of the first BBDL 11 with respect to the analog signal but not with respect to the DC and clock frequency components as indicated in FIGS. 4*d* and 4*e*. In the FIG. 3 embodiment, a conventional second inverter 31 is connected to the outout of BBDL 12 for inverting its output signal. The output of inverter 31 is algebraically summed with the output of BBDL 11 in conventional algebraic summer 32. The output of algebraic summer 32 is identical to the output of differential summer 14 in FIG. 1 and is indicated in FIG. 4*f*. The waveform in FIG. 4*f*, as well as the waveforms in FIGS. 4*d*, and 4*e* are delayed by the BBDL time delay T relative to the analog input waveform in FIG. 4*a*. Thus, the operation of our differential bucket-brigade circuit results in a delayed, sampled output waveform $s(t-T)$ having no undesired DC and clock frequency components. It can be seen in FIG. 4*f* that the output waveform $s(t-T)$ consists of voltage pulses each having a duration of half a clock period and corresponding to the sampled analog input signal. The voltage pulses are spaced from each other by half a clock period, and this spacing may be tolerated in some cases. However, cancellation of the undesired spectral energy contained in the sampled data form of the input signal, $s(t-T)$, is often desirable since it permits relaxation of a generally utilized post-brigade filter network. Also, amplifiers which are generally utilizied in post-brigade circuits are slewrate limited, and the switched output signal at half clock periods can cause amplifier instability or distortion.

Figure 4G:
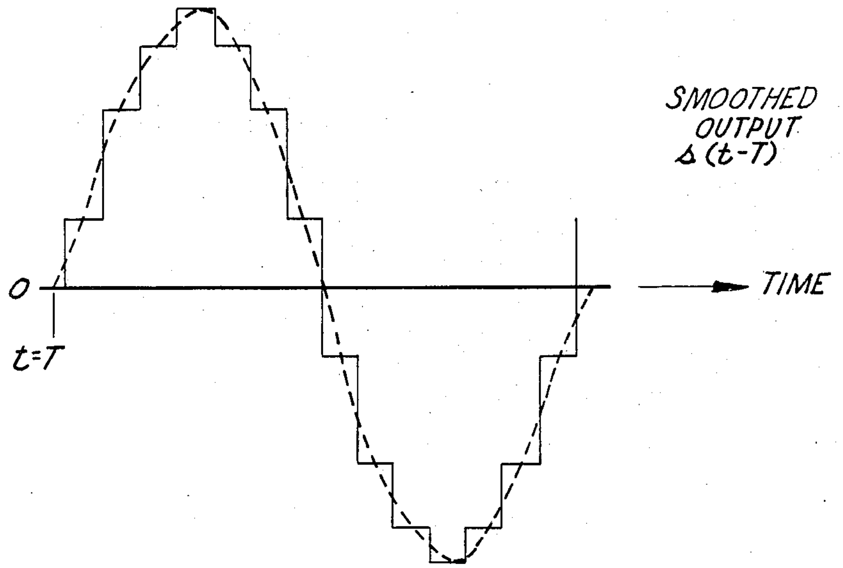

A first means for obtaining cancellation of unwanted spectral energy in the output signal is illustrated in FIG. 2 wherein the BBDL output at the source electrode of transistor 22*a* is connected to a first input of a conventional algebraic summer 25, and the input to the source electrode of transistor 21*i* is also connected to the gate electrode of a transistor 26. The drain electrode of transistor 26 is connected to the same source of voltage $V_{b2}$ as in the output circuit 22, and the source electrode is connected to the second input of summer 25. The smoothed output of summer 25 is illustrated in FIG. 4*g* and is the same as the output illustrated in FIG. 4*f* but with cancellation of much of the undesired high frequency spectral energy.

A second means for obtaining cancellation of unwanted high frequency components is illustrated in FIG. 5 wherein two additional BBDLs are utilized in push-pull connection about the original BBDLs 11 and 12. Thus, a third BBDL 50 also of N stages is connected in parallel with BBDL 11, and a fourth BBDL 51 also of N stages is connected in parallel with BBDL 12. The bucket-brigade stages in BBDLs 50 and 51 are clocked in parallel with the corresponding stages in BBDLs 11 and 12, respectively, but 180° out-of-phase as indicated by the reversed $C_p$ and $\overline{C}_p$ clock line inputs to BBDLs 50 and 51 relative to BBDLs 11 and 12. The effect of the push-pull connection of each pair of BBDLs is to sum the reference level $V_r$ and the sample value of the delayed input signal $s(t-T)$ for each half clock period and thus the output of the push-pull BBDLs 11 and 50 is a waveform such as illustrated in FIG. 4g but of single (half) amplitude and the output of BBDLs 12 and 51 is the inverse thereof. As a result, the output of differential summer 14 in FIG. 5 is the waveform of double amplitude illustrated in FIG. 4g.

Figure 4H:
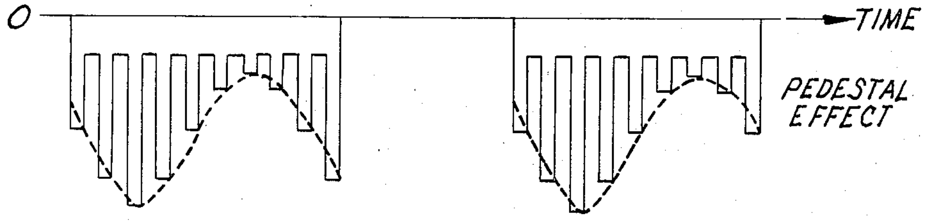

The description hereinabove resulting in the cancellation of undesired DC and clocck frequency components in the output signal has assumed a continuous mode operation of our circuit. There are many instances wherein a gated mode of operation is utilized by gating the operation of the clock generator 13. the gated mode of operation results in a pedestal effect at the output of each BBDL such as is illustrated in FIG. 4h wherein the BBDL output signal is gated on and off for particular time periods which may or may not be equal. It is readily apparent from FIG. 4h that the alternate on and off periods of the output signal will result in an average DC level existing in the output signal, and that this average DC level will vary directly with the on/off duty cycle of the BBDL. It is further evident that although a simple decoupling circuit will remove this average DC component, the analog component of the output signal will still have a residual DC component which is highly undesirable. Operation of our differential bucket-brigade circuit illustrated in FIGS. 1, 3 and 5 also results in cancellation of this pedestal effect residual DC level since all of the undesired DC components are canceled in the differential summation and thus even a gated mode of operation of our circuit provides a faithful reproduction of the analog input signal.

From the foregoing, it can be appreciated that the objects set forth have been met and that our invention provides a BBDL circuit operating in a differential mode which obtains cancellation of DC and clock frequency components that are normally introduced during the operation of such circuit. Our circuit is readily capable of being implemented in monolithic integrated circuit form. It should be obvious that our BBDLs may be formed with more complex input and output stages. Thus, it is to be understood that modifications may be made in our invention without departing from the intended scope thereof as defined by the following claims.

What we claim as new and desire to secure by Letters Patent of the United States is:

1. A digitally controlled analog charge transfer circuit comprising
 a first digitally controlled analog charge transfer circuit for sampling and delaying an analog input signal applied thereto,
 a second digitally controlled analog charge transfer circuit having the same number of charge transfer stages as said first charge transfer circuit for sampling and delaying by an equal time the analog input signal applied thereto but inverted with respect to the corresponding analog input signal applied to said first charge transfer circuit,
 first means connected to an input of said second charge transfer circuit for inverting the analog input signal applied thereto,
 clock pulse generator means for supplying two-phase clock voltage pulses in parallel and in-phase to corresponding switching elements of said first and second charge transfer circuits to cause propagation of the sampled analog input signal through said first and second charge transfer circuits, respectively,
 bias voltage means for biasing the inputs of said first and second charge transfer circuits sufficiently to prevent the sampled analog signal from forward biasing diode junctions within said first and second charge transfer circuits during its propagation through said first and second charge transfer circuits, and
 means for differentially summing outputs of said first and second charge transfer circuits to thereby cancel undesired D.C. and clock frequency voltage components in the signals at the outputs of said first and second charge transfer circuits resulting from the bias voltage and sample and delay processing of the analog input signal.

2. The digitally controlled analog charge transfer circuit set forth in claim 1 wherein
 said differential summing means is a differential summer having first and second inputs connected to outputs of said first and second charge transfer circuits, respectively.

3. The digitally controlled analog charge transfer circuit set forth in claim 2 wherein
 the first and second inputs of said differential summer are positive and negative input terminals thereof.

4. The digitally controlled analog charge transfer circuit set forth in claim 1 wherein
 said differential summing means comprises
 second means connected to an output of said second charge transfer circuit for inverting the sampled and delayed output signal thereof, and
 an algebraic summer having a first input connected to an output of said second inverting means and a second input connected to an output of said first charge transfer circuit.

5. The digitally controlled analog charge transfer circuit set forth in claim 1 and further comprising
 means connected to said first and second charge transfer circuits for cancelling undesired high frequency components in the signals at the outputs of said first and second charge transfer circuits.

6. The digitally controlled analog charge transfer circuit set forth in claim 5 wherein said high frequency cancelling means comprises
 a third digitally controlled analog charge transfer circuit connected in parallel with said first charge transfer circuit in push-pull relationship therewith, and
 a fourth digitally controlled analog charge transfer circuit connected in parallel with said second charge transfer circuit in push-pull relationship therewith.

7. The digitally controlled analog charge transfer circuit set forth in claim 6 wherein said third and fourth charge transfer circuits having the same number of charge transfer stages as said first charge transfer circuit, said clock pulse generator means supplying the two-phase clock voltage pulses in parallel to corresponding switching elements of said first, second, third, and fourth charge transfer circuits, the clock pulses supplied to corresponding switching elements of said first and third charge transfer circuits being in 180° out-of-phase relationship, the clock pulses supplied to corresponding switching elements of said second and fourth charge transfer circuits being in 180° out-of-phase relationship.

8. The digitally controlled analog charge transfer circuit set forth in claim 5 wherein said high frequency cancelling means comprises a first transistor having a gate electrode connected to an input of the last charge transfer stage of said first charge transfer circuit, and a drain electrode connected to a source of D.C. voltage, a first algebraic summer having a first input connected to the output of said first charge transfer circuit, said first transistor having a source electrode connected to a second input of said first algebraic summer, a second transistor having a gate electrode connected to an input of the last charge transfer stage of said second charge transfer circuit, and a drain electrode connected to the source of D.C. voltage, and a second algebraic summer having a first input connected to the output of said second charge transfer circuit, said second transistor having a source electrode connected to a second input of said second algebraic summer, outputs of said first and second algebraic summers connected to inputs of said differentially summing means.

9. The digitally controlled analog charge transfer circuit set forth in claim 1 wherein said first and second charge transfer circuits are respectively first and second bucket-brigade delay lines each comprising an input sampling stage, a like plurality of delay line stages each consisting of a pair of serially connected bucket-brigade stages, and an output stage.

10. The digitally controlled analog charge transfer circuit set forth in claim 9 wherein each pair of serially connected bucket-brigade stages includes two serially connected electronic switches and a storage capacitor connected to each said electronic switch.

11. The digitally controlled analog charge transfer circuit set forth in claim 10 wherein said electronic switches are transistors.

12. The digitally controlled analog charge transfer circuit set forth in claim 11 wherein said transistor switches are of the bipolar type.

13. The digitally controlled analog charge transfer circuit set forth in claim 11 wherein said transistor switches are of the field effect type.

14. The digitally controlled analog charge transfer circuit set forth in claim 8 wherein said field effect transistors are of the MOSFET type.

15. The digitally controlled analog charge transfer circuit set forth in claim 13 wherein said field effect transistors are of the MESFET type.

16. The digitally controlled analog charge transfer circuit set forth in claim 13 wherein said field effect transistors are of the JFET type.

* * * * *